July 3, 1956
W. H. A. BOYD
2,753,177
FRICTION SPRING SHOCK ABSORBER
Filed April 20, 1953
2 Sheets-Sheet 1
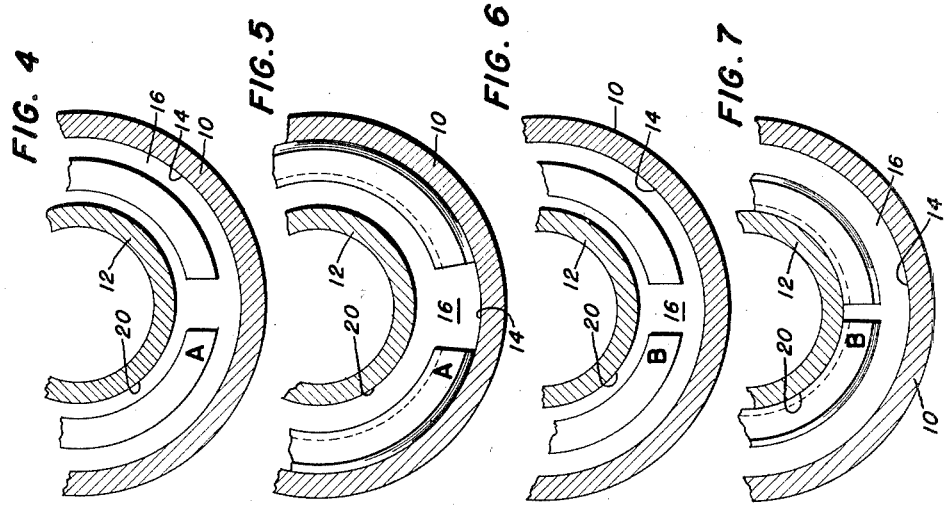
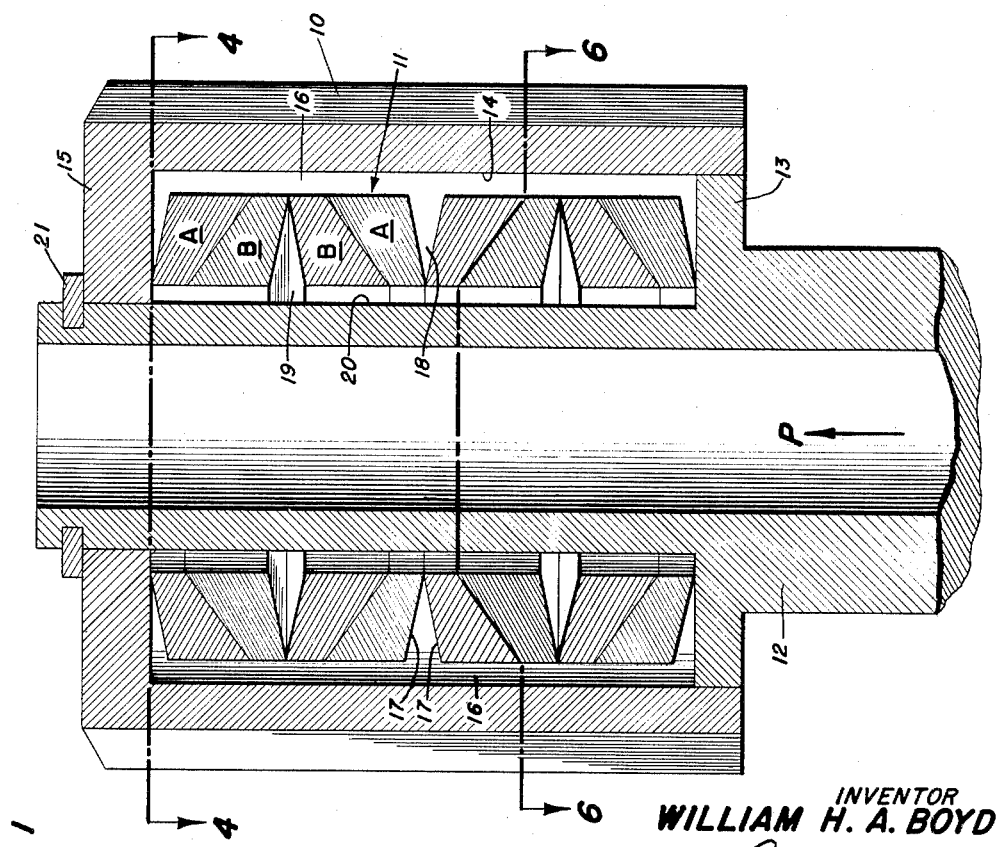
INVENTOR
WILLIAM H. A. BOYD
BY
ATTORNEYS July 3, 1956  W. H. A. BOYD  2,753,177
FRICTION SPRING SHOCK ABSORBER
Filed April 20, 1953  2 Sheets-Sheet 2
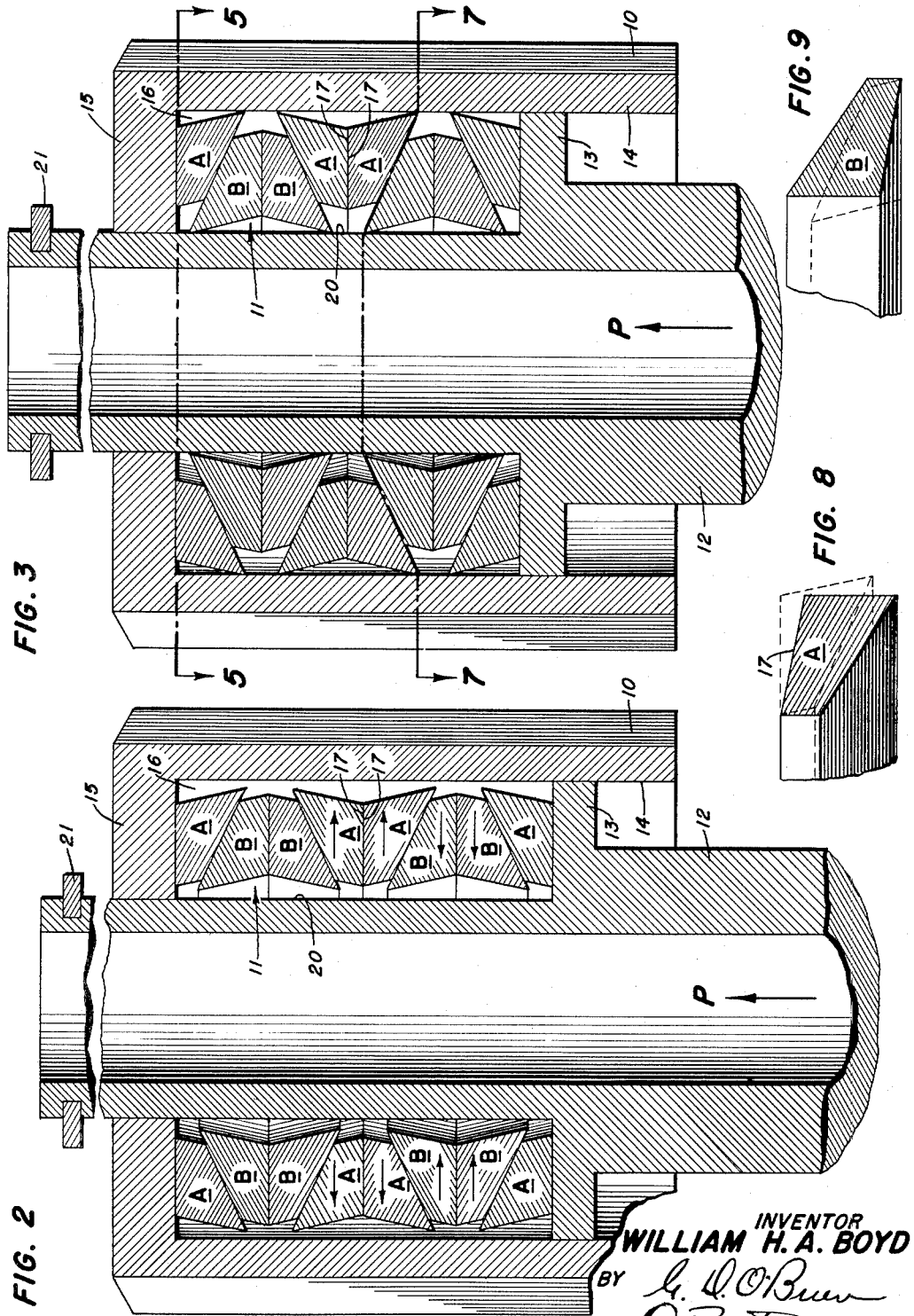
INVENTOR
WILLIAM H. A. BOYD
BY
ATTORNEYS

United States Patent Office 2,753,177
Patented July 3, 1956

2,753,177

FRICTION SPRING SHOCK ABSORBER

William H. A. Boyd, Kensington, Md., assignor to the United States of America as represented by the Secretary of the Navy Application April 20, 1953, Serial No. 349,990

3 Claims. (Cl. 267—9)

(Granted under Title 35, U. S. Code (1952), sec. 266)

The invention described herein may be manufactured and used by or for the Government of the United States of America for governmental purposes without the payment of any royalties thereon or therefor.

The present invention relates to a frictional spring shock absorber and more particularly to a differential load deflection frictional ring shock absorber.

Various spring shock absorbing devices have been contrived to absorb uniformly an applied constant or shock axial load thereby producing proportional displacement of the load resistance. The characteristics of conventional single coil spring shock absorbers are usually such that they will flex uniformly and be displaced proportional to the load applied. In shock absorber applications where differential load absorption and displacement is required, two or more helical springs of varying lengths and cross-sectional areas are concentrically assembled within a suitable housing to offer the desired yielding resistance to the applied load. Various multiple combinations for differential load absorption have been incorporated into such spring shock absorbers including the practice of prestressing one or more of the concentrically assembled helical springs as well as selecting spring materials which will produce the desired result. Concentric helical springs may be assembled so that upon load application initial deflection by one spring absorbs a portion of the load, then by utilizing the frictional resistance offered by the contacting surfaces between the concentrically assembled springs and the resistance offered by the remaining springs the residue of the load is absorbed. Where space limitations are critical the conventional devices have been found to be too cumbersome to absorb loads of any substantial magnitude.

In loading a helical cylindrical type spring, as the spring is compressed the helices are displaced axially without regard to lateral or radial displacement because the spring configuration limits lateral movement and objectionable overlapping of the helices. A spiral helical spring or an axially loadable spiral spring has not been used to any advantage in frictional shock absorbers due to insufficient load absorption and to the large housings required for operation.

Spring washers and spring disks of various types, particularly of the Belleville type, have found wide application by selectively stacking the washers or disks to obtain the desired load deflection.

The present invention may be appreciated best by considering the operational functions of the friction ring shock absorber developed to absorb differential loads that produce varying deflections at various stages of load application. A plurality of pairs of split rings, substantially trapezium-shaped in cross-sectional area, are stacked and aligned axially within an annular cavity formed within displaceable members of a housing to provide sufficient clearance within the cavity to permit radial expansion and contraction of the rings. The cross-sectional configuration of the split trapezium-shaped rings is such that opposed ring interfaces form wedge-shaped cavities therebetween. An initial compressing load applied to the load receiving displaceable member of the housing assembly will induce a torsional stress in the individual rings twisting each pair of rings sufficiently to eliminate substantially the wedge-shaped cavities formed between the pairs of rings. Continued loading will compress the pairs of split rings so that the inclined interfaces of adjacent rings will become contiguous and a frictional resistance to radial expansion and contraction of the pairs of rings will occur. As the magnitude of the axial load is increased a load point is reached which will overcome the frictional resistance of the ring interfaces and a relative lateral displacement between rings will occur whereby pairs of split rings will be forced toward the shock absorber axis and in so doing will decrease radially and an alternate pair of split rings will be forced outwardly from the shock absorber axis and in so doing will increase radially and thereby appreciably restrict final axial displacement.

This invention has as an object to provide a differentially displaceable shock absorber capable of absorbing loads of varying magnitude.

A further object of this invention is to provide a compact resilient spring construction particularly adapted for use as a shock absorber which will absorb impact of large magnitudes within a limited area.

Another object of this invention is to provide a frictional ring shock absorber that will deflect inversely proportional to the applied load at selected load stages.

A further object of this invention is to provide a novel ring resilient support that will effectively absorb a varying load by absorbing an initial load by torsional stress and frictional sliding resistance and by absorbing a final load by the combined increased frictional resistance and compression and tension stresses induced by the axial load.

Other objects and many of the attendant advantages of this invention will be readily appreciated as the same becomes better understood by reference to the following detailed description when considered in connection with the accompanying drawings wherein:

Fig. 1 is a longitudinal sectional view of a device constructed in accordance with the present invention;

Fig. 2 is a view of the embodiment of Fig. 1 showing the parts partially compressed;

Fig. 3 is a view similar to Fig. 1 illustrating the parts fully compressed;

Fig. 4 is a somewhat reduced partial transverse sectional view on a line substantially corresponding to line 4—4 of Fig. 1 showing the gap in one of the outer split rings;

Fig. 5 is a similar view showing an outer split ring fully expanded;

Fig. 6 is a similar view on the line substantially corresponding to line 6—6 of Fig. 1 showing the gap in one of the inner split rings;

Fig. 7 is a similar view on the line substantially corresponding to line 7—7 of Fig. 3 showing an inner split ring fully compressed;

Fig. 8 is an enlarged transverse section through one of the outer rings showing the normal shape in solid lines and the distorted shape in dotted lines; and Fig. 9 is a similar view of one of the inner rings.

Referring to the accompanying figures of the drawings, in which like numerals designate the same parts throughout the several views, a preferred form which the invention takes will be described in detail.

The invention as illustrated in the embodiments shown on the accompanying drawings is but one physical embodiment for the frictional ring resilient device or shock absorber and indicates a very simple structural application but it may readily be visualized that other structural embodiments are possible.

A cylindrical housing sleeve frame 10 is suitably supported by a structural base depending upon the specific application to be made of the frictional ring shock assembly 11. A load receiving member 12 illustrated in the embodiment by a tubular member is formed with a projecting flange 13 which slidably engages the inner peripheral wall 14 of the housing sleeve 10. The sleeve member 10 serves as a cylinder wherein the inner peripheral wall 14 acts as a bearing surface for the axially displaceable piston-like flange 13 on the load receiving tube 12. Limit means such as snap ring 21 may be securely fastened to the tube 12 thereby establishing a limit stop for the reciprocating load tube in the relaxed state. Upon releasing the load from the load receiving tube member 12, the stressed ring assembly 11 will urge the member 12 to return to the initial position thereby buttressing the engaging end 15 of the load member 12 against the snap ring 21.

A cylindrical annular cavity 16 is formed between the sleeve frame member 10 and the load receiving tube member 12 within which the tube 12 may slide axially guided by the cylindrical wall 14 which is engaged by the piston-like flange 13 on tube 12 upon application of a load P.

A series of split rings A, and B of suitable resilient material may be selectively positioned within the annular cavity to absorb axial thrusts from the load tube 12. In the preferred form these split rings may have an irregular geometrical cross-sectional area as illustrated in Figs. 8 and 9. The cross section as shown is substantially trapezoidal, however, it will be apparent that the plane geometrical figure may approach that of a trapezium or may be other suitable shape or combination of shapes. The material of each ring A and B is selected in accordance with the desirable physical properties of the material and with respect to the particular load application. It is readily conceivable that the structural material for the individual rings may vary to achieve a desired resulting displacement for various load increments.

In the illustrated embodiment a series of the split rings A and B constituting the friction ring shock assembly 11 are selectively assembled within the cylindrical annular cavity 16. Pairs of rings, each pair comprising two similar rings A, A, or B, B, are positioned in pairs within the cavity 16. Each pair of rings is positioned so that similar interfaces are facing and opposed to each other thereby forming a wedge-shaped cavity between a pair of similar rings prior to loading. For example, as illustrated in Fig. 1, the pair of similar rings A, A is positioned with the interfaces 17, 17 of the short inclined plane facing each other. The trapezoidal configuration of the split rings A, A positioned with the large base or cylindrical element at the outer periphery of the ring permits the formation of a wedge-like gap 18 tapering inwardly between the pair of rings A, A and the apex of the wedge is formed by the converging planes of the rings at the circle of contact between the rings A, A at their inner periphery. In the rings B, B the large base or cylindrical element of each ring is located on the inner periphery and permits the formation of a wedge-like gap 19 tapering outwardly between the pair of rings B, B and the apex of the wedge is formed by the converging planes of the rings B, B at the circle of contact between the rings at their outer periphery. There is interfacial contiguous contact between the inclined surfaces of the rings A and rings B. At each end of the shock absorber cavity 16 spacer rings A are positioned to provide the requisite terminal points of support for the intermediate pairs of rings.

The individual rings A and B, as illustrated in Figs. 4 through 7, have a segment removed therefrom to permit free ring expansion and contraction or radial yieldability in addition to torsional flexure. The relaxed position of ring A in Fig. 4 represents the relative location of the ring with respect to the sidewalls of the annular cavity 16 illustrating the requisite clearance for lateral displacement upon ring radial expansion and is the condition shown in Fig. 1 prior to loading. The final representation after the full load is applied, as in Fig. 3, shows the ring A with its outer peripheral wall forced outwardly against the cylindrical wall 14 of the cavity 16. Fig. 5 illustrates the expanded and twisted condition of a ring A in the final stage of load absorption. Ring B will function in a manner opposite from ring A, that is, since the inner periphery of ring B has the greater base or cylindrical element radial contraction of the ring B will occur toward the inner wall 20 of the annular cavity 16 and the transition is portrayed in Figs. 6 and 7. It will be appreciated that each ring undergoes a compressive as well as a tensile force while expanding or contracting. For example, as ring A expands from the relaxed position the region toward the outer periphery beyond the neutral axis is subjected to a compressive stress and the area on the inner periphery from the neutral axis is subjected to a tensile stress. The forces on ring B are conversely affected, that is, the inner periphery undergoes compression and the outer periphery is under tension.

An explanation of the operation of the frictional ring shock absorber will best indicate the cooperation of the various elements. A load P is applied axially to the load member 12 as shown in Fig. 1 to initiate an annular torsional couple within the individual split rings in the assemblage 11 within the annular cavity 16. Load absorption subjects the individual rings to torsional deflection or twisting and displaces the assemblage axially so that the gaps 18 and 19, wedge-shaped, formed between the pairs of rings A, A, and B, B, are compressed and the similar interfaces, for example 17, 17, once separated by the gap 18 are now made contiguous. Simultaneously with the initial load absorption which induces compression of the wedge-like gaps, a lateral displacement of the pairs of rings A, A, and B, B, occurs as illustrated in Fig. 2. Therefore, the load is absorbed at this point by: (1) the torsional stresses induced within the rings and indicated by the deflection of the rings, clearly shown by the depletion of the gaps, (2) the tensile and compressive stresses in each ring induced by the expansion and contraction of the pairs of split rings upon lateral displacement, and (3) the frictional resistance offered for lateral displacement by the inclined surfaces of individual contiguous rings. Figs. 8 and 9 indicate the relative distortions of the rings from the initial to the final shape after torsional stress has been imposed by the twisting couple moment. Lateral displacement of the pairs of rings B, B is limited in the inward movement by the outer wall of the loaded tube member 12 and outward lateral displacement is limited by the inner cylindrical wall 14 of the sleeve 10. It is to be noted that final load absorption will be effected by the continued lateral displacement of the radially expansible frictional contacting surfaces of the respective pairs of rings relative to each other along their inclined interfacial surface areas. Although the embodiment illustrates smooth inclined surfaces, it is to be understood that roughened or serrated surfaces may be used as well. In addition, thereto, special high frictional coefficient material surfaces which will offer greater frictional resistance to slippage between the inclined surfaces may be employed.

The ratio of the relative displacements occurring within the shock absorber will be measured by the linear deflections commencing with the initial load application as measured by the twisting of the rings and the slight lateral displacement to the final load application as measured by the deflection normal to the lateral displacement of the rings resulting from the frictional sliding between rings and the tension and compression forces which act to increase or decrease the diameters of the rings A, B. As the applied load is released the rings of shock absorber will return expanding quickly to the initial shape thereby re-establishing load member 12 to the original relaxed position shown in Fig. 1.

Obviously many modifications and variations of the present invention are possible in the light of the above teachings. It is therefore to be understood that within the scope of the appended claims the invention may be practiced otherwise than as specifically described.

What is claimed:

1. A frictional ring shock absorber comprising; a load receiving member, a housing with which said member cooperates and forms an annular cavity therebetween, a plurality of groups of split rings stacked in superimposed relation having an irregular quadrilateral configuration and said groups of rings contacting one another at the inner edges thereof and having adjacent surfaces defining an outwardly diverging wedge-shaped cavity, each of said groups comprising a plurality of subgroups of split rings, at least one of said subgroups having adjacent surfaces defining an outwardly converging wedge-shaped cavity, the split rings in each of said subgroups having inclined interfacial surfaces in engagement with similar surfaces on the split rings of adjacent subgroups, said wedge-shaped cavities being defined prior to the application of a load to the shock absorber whereby upon initial load application to the load receiving member the individual rings will be subjected to a torsional stress and will be displaced to remove the wedge-shaped cavities between said rings so that the ring interfacial surfaces cooperatively engage to afford frictional resistance to lateral displacement upon continued load application.

2. A frictional ring shock absorber comprising a load receiving member, a housing to slidably support said member and form an enclosed cylindrical annular cavity therebetween, a plurality of groups of first and second pairs of distortable rings positioned within said housing and in engagement with the housing and said load receiving member, each of said rings being trapezium shaped in cross-sectional area and split to facilitate radial expansion and contraction thereof, the rings of said first pair having outwardly converging opposing surfaces and coaxially spaced from one another to define a first wedge-shaped annular cavity therebetween, the rings of said second pair being slidably disposed within said first wedge-shaped cavity and having outwardly converging adjacent surfaces in engagement with one another at the outer edges thereof to define a second wedge-shaped annular cavity therebetween, adjacent rings in said first and second pairs of rings being in surface contact and having a cross-sectional configuration of a parallelogram radially spaced from both the load receiving member and the housing prior to the application of a load to the shock absorber, said rings being distorted by relative displacement between the load receiving member and the housing when a load is applied to eliminate said second cavity and make all ring interfaces contiguous to offer increased frictional resistance for ring expansion and contraction during continued load application, the rings of said first pair being laterally displaced outwardly and the rings of said second pair being laterally displaced inwardly until contact with the inner wall of the housing and the outer wall of the load receiving member, respectively, is effected when a predetermined load is applied.

3. A frictional ring shock absorber comprising in combination, a housing, a load receiving member slidable within said housing and forming an annular cavity therebetween, torsionally and laterally displaceable split rings having an irregular quadrilateral cross section disposed in superimposed alignment within said annular cavity, the width of said rings being substantially less than the width of said annular cavity for lateral movement of the rings therein, the top and bottom surfaces of each of the rings being inclined relative to said load receiving member and said housing to form alternating coaxial gaps and interfacial areas therebetween for axial torsional movement and frictional resistance to lateral movement of the rings respectively, whereby upon load application a torsional stress is exerted on said rings closing said gaps and continued load application will cause lateral movement of the rings along the interfacial areas thereby offering frictional, compressive, and tensile forces to further resist load application.

References Cited in the file of this patent

UNITED STATES PATENTS

| | | |
|---|---|---|
| 2,121,835 | Sproul | June 28, 1938 |
| 2,281,955 | Rosenweig | May 5, 1942 |
| 2,413,740 | Wikander | Jan. 7, 1947 |
| 2,489,023 | Gamble | Nov. 22, 1949 |

FOREIGN PATENTS

| | | |
|---|---|---|
| 16,905 | Great Britain | of 1909 |
| 406,383 | Germany | Nov. 22, 1924 |
| 424,711 | Germany | Jan. 29, 1926 |
| 463,777 | Germany | Aug. 3, 1928 |